(12) United States Patent
Mahajan et al.

(10) Patent No.: US 8,762,563 B2
(45) Date of Patent: Jun. 24, 2014

(54) METHOD AND APPARATUS FOR IMPROVING THE ADAPTIVE BIT RATE BEHAVIOR OF A STREAMING MEDIA PLAYER

(75) Inventors: Vaneet Mahajan, Pathankot (IN); Karishma Bagga, Bhopal (IN); Kakkirala Naga Venkata Surya Maruthi Lakshman, Bangalore (IN)

(73) Assignee: Adobe Systems Incorporated, San Jose, CA (US)

( * ) Notice: Subject to any disclaimer, the term of this patent is extended or adjusted under 35 U.S.C. 154(b) by 87 days.

(21) Appl. No.: 13/447,853

(22) Filed: Apr. 16, 2012

(65) Prior Publication Data

US 2013/0275610 A1    Oct. 17, 2013

(51) Int. Cl.
*G06F 15/16* (2006.01)
(52) U.S. Cl.
USPC .......................................................... 709/231
(58) Field of Classification Search
USPC ......................................... 709/227, 230, 231
See application file for complete search history.

(56) References Cited

U.S. PATENT DOCUMENTS

| | | | |
|---|---|---|---|
| 6,937,770 B1 | 8/2005 | Oguz et al. | |
| 2003/0110234 A1 | 6/2003 | Egli et al. | |
| 2009/0300203 A1* | 12/2009 | Virdi et al. | 709/231 |
| 2011/0083144 A1 | 4/2011 | Bocharov et al. | |
| 2011/0239078 A1 | 9/2011 | Luby et al. | |
| 2011/0246621 A1* | 10/2011 | May et al. | 709/219 |
| 2011/0246659 A1 | 10/2011 | Bouazizi | |

OTHER PUBLICATIONS

"An Experimental Evaluation of Rate-Adaptation Algorithms in Adaptive Streaming Over HTTP", Saamer Akhshabi et al, MMSys '11, Feb. 23-25, 2011, San Jose California, Copyright 2011, 12 pages.
"IIS Smooth Streaming Technical Overview" Microsoft Silverlight, Windows Server Internet Information Services 7.0, Alex Zambelli, Microsoft Corporation—Mar. 2009, 17 pages.

* cited by examiner

*Primary Examiner* — Wing F Chan
*Assistant Examiner* — Andrew Woo
(74) *Attorney, Agent, or Firm* — Moser Taboada

(57) ABSTRACT

A method and apparatus for improving the adaptive bit rate behavior of a streaming media player comprises receiving a media stream from a first media content provider; assessing whether the streaming media player can benefit from the use of a media stream having a higher bit rate than the stream currently being received; selecting a higher bit rate stream from a second media content provider when the player can benefit from the use of a higher bit rate stream; requesting the higher bit rate stream from the second media content provider; receiving the higher bit rate stream; and rendering the media content using the higher bit rate stream.

16 Claims, 4 Drawing Sheets

METHOD AND APPARATUS FOR IMPROVING THE ADAPTIVE BIT RATE BEHAVIOR OF A STREAMING MEDIA PLAYER

BACKGROUND OF THE INVENTION

1. Field of the Invention

Embodiments of the present invention generally relate to multimedia streaming, and more particularly, to a method and apparatus for improving the adaptive bit rate behavior of a streaming media player.

2. Description of the Related Art

Media streaming is generally made available in multiple bit rates to serve clients of different capabilities and bandwidths. A media player processes the content at the best possible bit rate under the prevailing conditions. Generally, media players have a one-to-one connection to an origin server where the source content resides, and hence, all streams are fetched from the same server. The media player will start downloading content at a particular bit rate which is determined randomly or is the lowest bit rate available. The media player monitors a throughput obtained at this bit rate and makes a determination whether to switch to a higher or a lower bit rate based on the throughput. This determination is made based on the assumption that the throughput obtained for a particular stream is equal to a bandwidth for that connection and therefore, that other bit rate streams would have the same throughput. This assumption holds true when streams of various bit rates had to be fetched from the same server, for example, in connection-oriented protocols like Real Time Messaging Protocol (RTMP) and Real Time Streaming Protocol (RTSP). However, this assumption does not hold true for connectionless protocols, like HyperText Transfer Protocol (HTTP).

Therefore, there is a need for a method and apparatus for improving the adaptive bit rate behavior of a streaming media player.

SUMMARY OF THE INVENTION

Embodiments of the present invention provide a method and apparatus for improving the adaptive bit rate behavior of a streaming media player. In one embodiment, the method comprises receiving a media stream from a first media content provider. The method then assesses whether the streaming media player can benefit from a media stream having a higher bit rate than the stream currently being received. The media player then selects a higher bit rate stream from a second media content provider and requests the higher bit rate stream when the media player can benefit from a higher bit rate stream. After receipt of the requested higher bit rate stream, the media player renders the media content using the higher bit rate stream.

Figure 1:
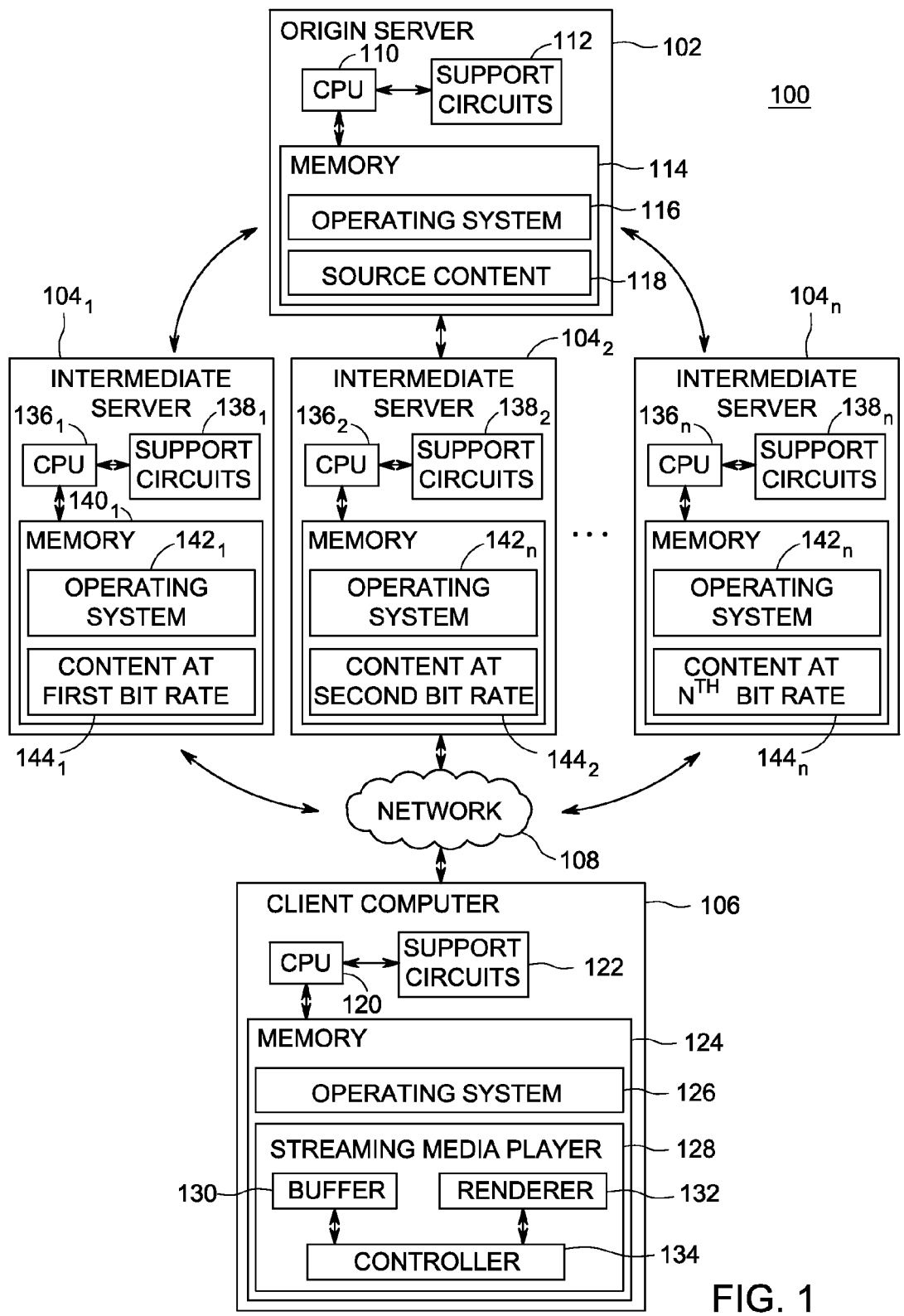
FIG. 1 depicts a system for improving the adaptive bit rate behavior of a streaming media player, according to one or more embodiments of the invention.

While the method and apparatus is described herein by way of example for several embodiments and illustrative drawings, those skilled in the art will recognize that the method and apparatus for improving the adaptive bit rate behavior of a streaming media player are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for improving the adaptive bit rate behavior of a streaming media player as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and apparatus for improving the adaptive bit rate behavior of a streaming media player. Embodiments of the invention improve the adaptive bit rate behavior of the streaming media player by taking advantage of HTTP's caching infrastructure. With HTTP, there is not a one-to-one connection to the origin server, but instead, the media content may be cached anywhere. The HTTP caching infrastructure provides for the possibility where a higher bit rate stream may have a better throughput because that media content is being cached at an intermediate point, like a browser, Internet Service Provider (ISP) server, or a Content Distribution Network (CDN). But the typical media player would never realize a higher bit rate stream may have a better throughput because it assumes that the throughput obtained for a particular stream is the bandwidth it has available. The caching infrastructure provides for the possibility where a higher bit rate stream may have a better throughput because that media content is being cached at an intermediate point. Media content is initially received from an origin server. However, media content may be cached at intermediate proxy servers (hereafter called content providers) at higher bit rates. Embodiments of the present invention proactively look for these higher bit rate streams, checking the higher bit rate throughputs. A controller of the media player assesses whether the streaming media player should look for a stream having a higher bit rate than the stream currently being received. The controller looks at a buffer in the media player to determine whether the buffer is holding enough content to continue rendering content while the controller searches in a network for a higher bit rate stream. The controller may also look at the network to assess parameters such as dropped frame rate, throughput obtained for a particular bit rate stream, for example, by calculating (a number of bytes downloaded)/(time taken to download the number of bytes), or the history of that bit rate stream over the network. If the media player is able to benefit from the use of a stream having a higher bit rate and the network assessment reveals the network is stable, the controller looks for higher bit rate streams available from the content providers and measures the throughput that would be obtained for each of the available bit rates. The controller selects a bit rate and requests the higher bit rate stream from a media content provider. The controller receives the higher bit rate stream, and at the next partition of the stream, the media player renders the media content at the higher bit rate. As a result, the media player provides a better user experience.

Various embodiments of an apparatus and method for improving the adaptive bit rate behavior of a streaming media player are described. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the present invention provide a method and apparatus for improving the adaptive bit rate behavior of a streaming media player by taking advantage of the HTTP caching infrastructure, wherein higher bit rate streams may be cached at content providers with better throughput than media content currently being played on the media player. Advantageously, embodiments process the best possible bit rate stream under the prevailing operating circumstances. The embodiments utilize a proactive approach of fetching higher bit rate streams from different content providers and therefore provide a better user experience.

FIG. 1 depicts a system 100 for improving the adaptive bit rate behavior of a streaming media player, according to one or more embodiments of the invention. The system 100 comprises an origin server 102 coupled to a plurality of intermediate servers $104_1, 104_2 \ldots 104_n$ which are further coupled to at least one client computer 106 through a network 108.

The origin server 102 comprises a CPU 110, support circuits 112, and a memory 114. The server 102 is a type of computing device known to one of ordinary skill in the art that is used for computing services. The CPU 110 may comprise one or more commercially available microprocessors or microcontrollers that facilitate data processing and storage. The various support circuits 112 facilitate the operation of the CPU 110 and include one or more clock circuits, power supplies, cache, input/output circuits, displays, and the like. The memory 114 comprises at least one of Read Only Memory (ROM), Random Access Memory (RAM), disk drive storage, optical storage, removable storage and/or the like. The memory 114 comprises an operating system 116, and source content 118.

The intermediate servers (hereafter referred to as "content providers") $104_1, 104_2 \ldots 104_3$ (collectively, 104), each comprise a CPU 136, support circuits 138, and a memory 140. The content providers 104 are a type of computing device known to one of ordinary skill in the art that is used for computing services. The CPU 136 may comprise one or more commercially available microprocessors or microcontrollers that facilitate data processing and storage. The various support circuits 138 facilitate the operation of the CPU 136 and include one or more clock circuits, power supplies, cache, input/output circuits, displays, and the like. The memory 140 comprises at least one of Read Only Memory (ROM), Random Access Memory (RAM), disk drive storage, optical storage, removable storage and/or the like. The memory 140 comprises an operating system 142, and content at a particular bit rate. For example, content provider $104_1$ provides content at a first bit rate $144_1$; content provider $104_2$ provides content at a second bit rate $144_2$, and so on to content provider $104_n$ providing content at a bit rate $144_n$.

According to some embodiments, the operating system (OS) 142 generally manages various computer resources (e.g., network resources, file processors, and/or the like). The operating system 142 is configured to execute operations on one or more hardware and/or software modules, such as Network Interface Cards (NICs), hard disks, virtualization layers, firewalls and/or the like.

The network 108 comprises a communication system that connects computers by wire, cable, fiber optic and/or wireless link facilitated by various types of well-known network elements, such as hubs, switches, routers, access points and the like. The network 108 may employ various well-known protocols to communicate information amongst the network resources.

The client computer 106 comprises a CPU 120, support circuits 122, and a memory 124. The client computer 106 is a type of computing device (e.g., a laptop, a desktop, a Personal Digital Assistant (PDA), a mobile phone and/or the like) known to one of ordinary skill in the art. The CPU 120 may comprise one or more commercially available microprocessors or microcontrollers that facilitate data processing and storage. The various support circuits 122 facilitate the operation of the CPU 120 and include one or more clock circuits, power supplies, cache, input/output circuits, displays, and the like. The memory 124 comprises at least one of Read Only Memory (ROM), Random Access Memory (RAM), disk drive storage, optical storage, removable storage and/or the like. The memory 128 comprises an operating system 126 and a streaming media player 128. The streaming media player 128 comprises a buffer 130, a renderer 132, and a controller 134.

According to some embodiments, the operating system (OS) 126 generally manages various computer resources (e.g., network resources, file processors, the display and/or the like). The operating system 126 is configured to execute operations on one or more hardware and/or software modules, such as Network Interface Cards (NICs), hard disks, virtualization layers, firewalls and/or the like. For example, the streaming media player 128 can recall commands associated with the operating system 126 (i.e., native operating system commands) to perform various operations, such as receiving content from at least one of the origin server 102 or the content providers 104, processing and rendering the content and/or the like. The streaming media player 128 may be any streaming media player such as ADOBE® Flash®, SONY° GoogleTV, AppleTV, ROKU®, and the like, capable of receiving, processing, and rendering media content from a content provider 104.

The streaming media player 128 receives the media stream from a plurality of content providers 104. According to some embodiments, the content providers 104 may be browser caches, ISP servers, nodes on a CDN, or intermediate HTTP caching servers. The content providers 104 may include media content at different bit rates $144_1$, $144_2$ ... $144_n$. For example, the content provider $104_1$ includes media content at a first bit rate $144_1$ and the content provider $104_2$ includes media content at a second bit rate $144_2$. In some embodiments, the second bit rate $144_2$ is higher than the first bit rate $144_1$.

The streaming media player 128 receives media content at a first bit rate $144_1$ from the content provider $104_1$. The controller 134 assesses at least one of the streaming media player 128 or the network 108 to determine whether the streaming media player 128 can utilize a higher bit rate stream. The controller 134 analyzes the streaming media player 128 to assess the fullness of the buffer 130 to determine whether there is enough content in the buffer 130 to continue rendering content while the controller 134 searches for the higher bit rate stream. The controller 134 also looks at the network to assess various parameters, such as frame rate, throughput obtained for a particular bit rate stream, or a history of a bit rate stream over the network 108. If the buffer is sufficiently full and the network is stable, the controller 134 will determine that the media player 128 can benefit from the use of a higher bit rate stream.

Content of various bit rates may be provided by the origin server 102. When a controller 134 makes a request to fetch media content at a higher bit rate from the origin server 102, the request is routed through a number of content providers 104. The origin server 102 sends the media content as a response and the media content is routed back through the same set of content providers 104. The content providers can cache the content so that if there is a request in the future for the same content, the content provider 104 can serve the media content without routing the request to the origin server 102 again.

After determining that the streaming media player 128 can handle and benefit from the higher bit rate stream, the controller 134 measures throughput statistics for the various bit rate streams that are available. The controller 134 assesses if media content of the higher bit rate $144_2$, available at a content provider $104_2$, has a higher bandwidth connection to the client computer 106. If the bandwidth of the connection between the content provider $104_2$ and the client computer 106 is equivalent to the higher bit rate, the controller 134 will request the content at the higher bit rate and will receive it from the content provider $104_2$. For example, an ADOBE® Flash® Player receives content from an origin server 102, which may be available at three bit-rates, namely 1000 kbps, 2500 kbps, and 4000 kbps. The ADOBE® Flash® Player begins receiving a bit rate stream at 1000 kbps, where the bandwidth to the origin server 102 is 1500 kbps. Given that the overall bandwidth to the origin server is 1500 kbps, the streaming media player 128 may not try to switch to 2500 kbps and if it did try to switch to 2500 kbps, the ADOBE® Flash®Player would not be able to play the 2500 kbps consistently due to the low bandwidth to the origin server and hence will switch back to 1000 kbps. However, the 4000 kbps stream may available in an HTTP cache at a higher throughput to the HTTP server 104. The controller 134 will find the 4000 kbps stream at the higher throughput and request the higher bit rate stream from the HTTP server 104. In response to the request the ADOBE® Flash®Player will begin receiving the bit rate stream at 4000 kbps. This provides a better viewing experience for the viewer because at the higher bandwidth, the content is loaded faster and there is less time waiting for the content to buffer, resulting in a more enjoyable viewing experience.

At the next partition in the stream, the renderer 132 on the streaming media player 134 switches from rendering the lower bit rate stream to rendering the higher bit rate stream, as explained in FIG. 3 below. In this way, the embodiments of the invention improve the adaptive bit rate of the media player and provides rendering of the media stream at the higher bit rate, thereby enhancing the user experience.

Figure 2:
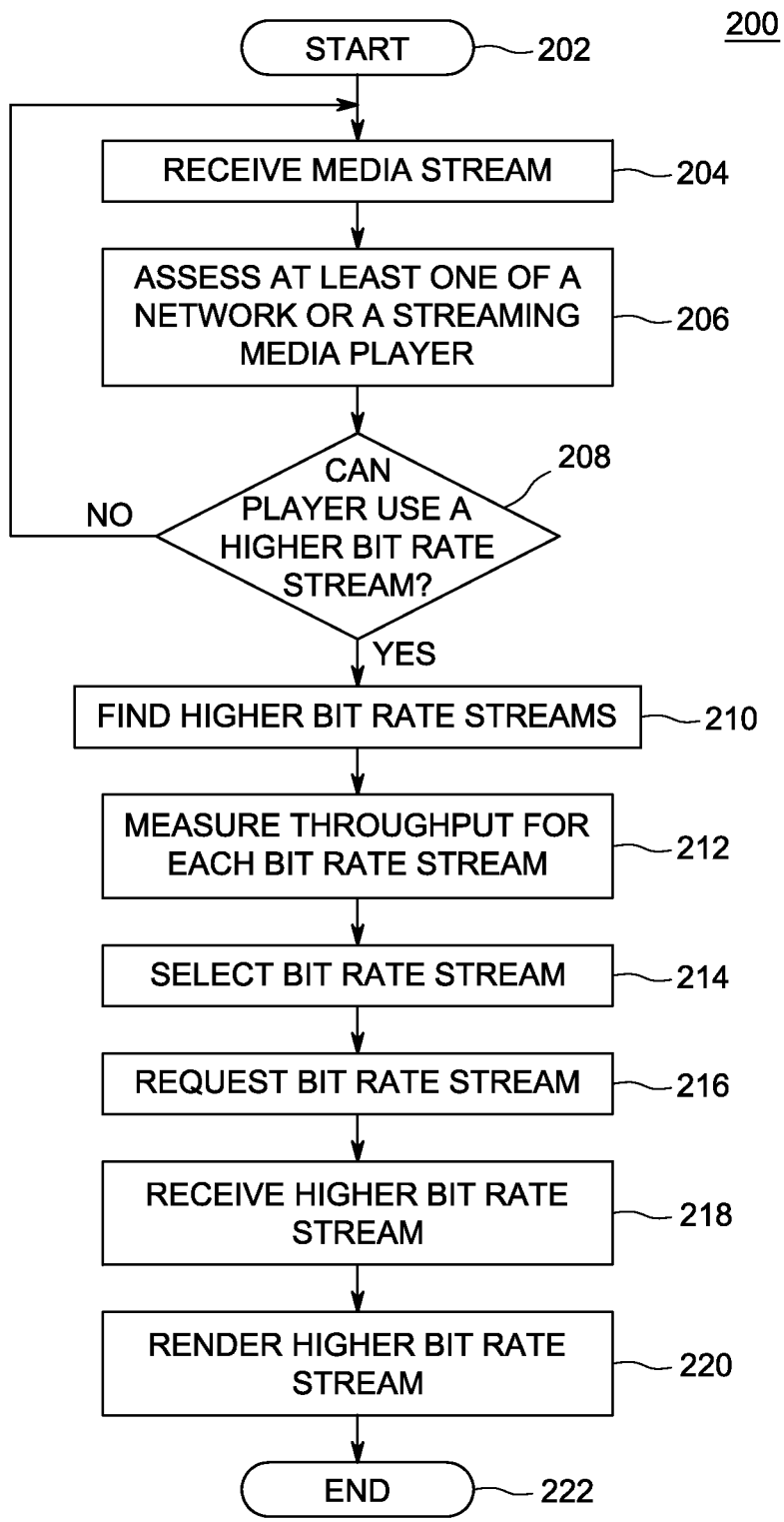
FIG. 2 depicts a flow diagram of a method for adapting bit rate as performed by a controller of the streaming media player of FIG. 1, according to one or more embodiments of the invention.

FIG. 2 depicts a flow diagram of a method 200 for adapting the bit rate as performed by a controller 134 of the streaming media player 128 of FIG. 1, according to one or more embodiments of the invention. The method 200 streams media content at a particular bit rate and when the buffer is sufficiently full, looks for media content at a higher bit rate. The controller selects and receives the media content at the higher bit rate and at the next partition of the stream, the media player renders the content at the higher bit rate.

The method 200 starts at step 202 and proceeds to step 204. At step 204, the method receives a media stream. In some embodiments, a streaming media player receives a first media stream from a first content provider. The bit rate of the first media stream may be random or it may be the lowest bit rate available. The method 200 proceeds to step 206. At step 206, the method 200 accesses at least one of the streaming media player or a network to determine whether the streaming media player can benefit from use of a higher bit rate stream. The method 200 analyzes the streaming media player to assess the fullness of a buffer to determine whether there is enough content in the buffer to continue rendering content while the controller searches for the higher bit rate stream. The method 200 also looks at the network to assess various parameters, such as frame rate, a throughput obtained for a particular bit rate stream, or a history of a bit rate stream over the network. This assessment will determine whether the network is stable. The method 200 proceeds to step 208.

At step 208, a determination is made whether the streaming media player can utilize a higher bit rate stream, meaning the buffer is full and the network parameters, such as frame rate, throughput, or history of the bit rate stream over the network are act acceptable levels to conclude the network is stable. If, at step 208, the method 200 determines that the media player is unable to utilize a higher bit rate stream, then the method proceeds to step 204 and continues streaming content at the current bit rate. If, at step 208, the method 200 determines that the media player can utilize a higher bit rate stream, the method 200 proceeds to step 210.

At step 210, the method 200 looks to a plurality of content providers in search of a higher bit rate stream. Content of various bit rates may be provided by the origin server or by a content provider which is closer to the client computer as compared to the origin server. The method 200 looks for content at a higher bit rate that may be available from a content provider which has a higher bandwidth connection to the client computer. The method 200 proceeds to step 212. At step 212, the method 200 measures a throughput for each bit rate stream found from each content provider. Since the streams are coming from different content providers, a bit rate stream from one content provider may have a different throughput as compared with a stream of the same bit rate from another content provider. The method 200 proceeds to step 214. At step 214, the method 200 selects a higher bit rate stream if it would provide a better throughput. The method 200 proceeds to step 216. At step 216, the method 200 requests the higher bit rate stream from the selected content provider. The method 200 proceeds to step 218. At step 218, the method 200 receives the higher bit rate stream. The method 200 proceeds to step 220. At step 220, the method 200 waits for a next partition in the stream and at the next partition, renders the higher bit rate stream as explained in FIG. 3 below. The method 200 proceeds to step 222 and ends.

Figure 3:
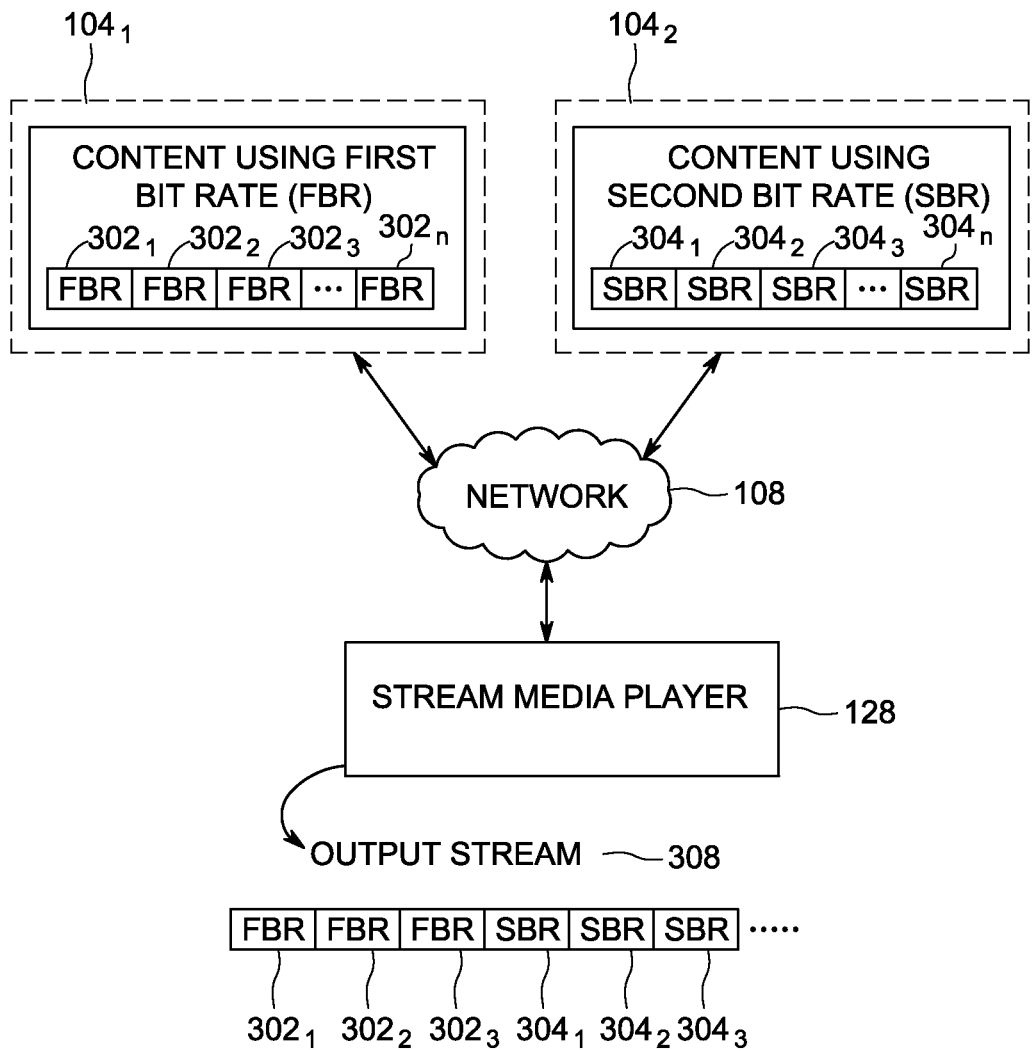
FIG. 3 depicts a block diagram showing the results of improving the adaptive bit rate on a streaming media player using the system of FIG. 1, according to one or more embodiments of the invention.

FIG. 3 depicts a block diagram showing the results of improving the adaptive bit rate on a streaming media player using the system of FIG. 1, according to one or more embodiments of the invention.

As illustrated, a plurality of content providers 104 exists on a network 108. Each content provider 104 may include media content at different bit rates. For example, a first content provider $104_1$ includes media content at a first bit rate and a second content provider $104_2$ includes media content at a second bit rate. The first bit rate (FBR) stream may be denoted by $302_1$, $302_2$ ... $302_n$ and the second bit rate (SBR) stream may be denoted by $304_1$, $304_2$ ... $304_n$. In this example, the streaming media player receives the first bit rate stream from content provider $104_1$ and renders the media stream at the first bit rate (FBR), namely, streams $302_1$, $302_2$, and $302_3$ in an output stream 308.

After determining that the streaming media player can handle, and benefit from the use of a higher bit rate, the controller of the media player seeks media content at the higher bit rate and requests the media content at the second (higher) bit rate. In some embodiments, another content provider, such as the second content provider $104_2$ can be located on the network and can provide the media content at the second (higher) bit rate. The controller then requests the higher bit rate stream from content provider $104_2$, and in response the content from content provider $104_2$ is received at the second bit rate and sent to the streaming media player. On receiving the content at the second bit rate, the renderer of the media player renders the media content at the second bit rate (SBR), such as $304_4$, $304_5$, and $304_6$ in the output stream 308.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Actionscript, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 4:
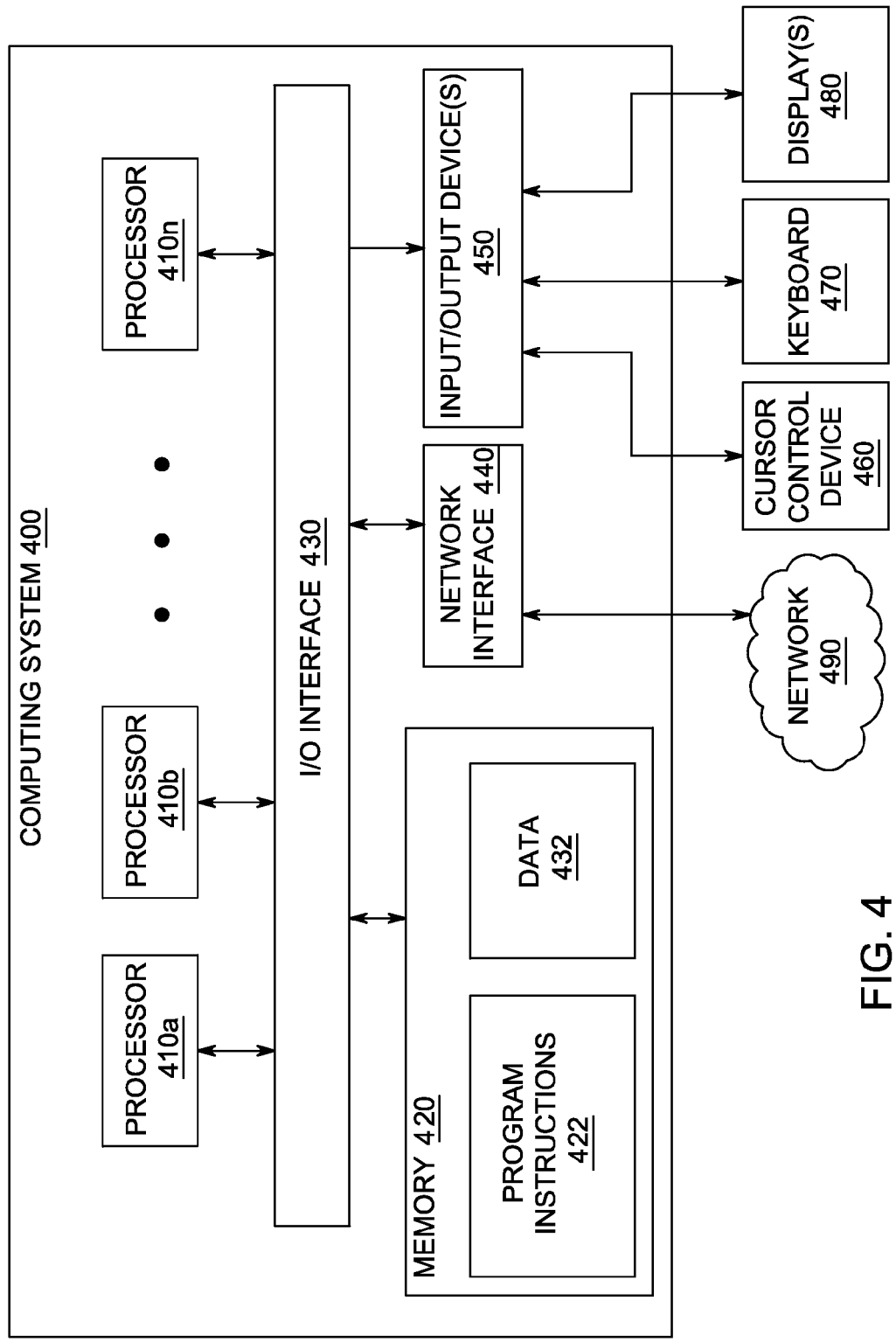
FIG. 4 depicts a computer system that can be utilized in various embodiments of the present invention, according to one or more embodiments.

FIG. 4 depicts a computer system that can be used to implement the method of FIG. 2 in various embodiments of the present invention, according to one or more embodiments of the invention.

Various embodiments of method and apparatus for improving the adaptive bit rate behavior of a streaming media player, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement method 200, as processor-executable executable program instructions 422 (e.g., program instructions executable by processor(s) 410) in various embodiments.

In the illustrated embodiment, computer system 400 includes one or more processors 410 coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of components may be utilized by the system to receive user input described above. In various embodiments, a user interface (e.g., user interface) may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs), such as the x96, PowerPC, SPARC, or MIPS ISAs, or any other suitable ISA. In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450, In some embodiments, I/O interface 430 may perform any necessary protocol, timing or other data transformations to convert data signals from one components (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 450 may, in some embodiments, include one or more display terminals, keyboards, keypads, touch pads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the methods described above, such as the methods illustrated by the flowchart of FIG. 2. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for improving the adaptive bit rate behavior of a streaming media player comprising:
   receiving a media stream from a first media content provider;
   assessing whether the streaming media player is able to benefit from use of a media stream having a higher bit rate than the stream currently being received and wherein assessing comprises determining whether a buffer will run out of content to render while a network of media content providers is being assessed;
   selecting a higher bit rate stream from a second media content provider when the player can benefit from use of a higher bit rate stream, wherein selecting a higher bit rate stream comprises finding a plurality of higher bit rate streams from a plurality of media content providers;
   requesting the higher bit rate stream from the second media content provider;
   receiving the higher bit rate stream; and
   rendering media content using the higher bit rate stream after waiting for a next partition in the media stream.

2. The method of claim 1, wherein assessing further comprises analyzing at least one of a frame rate, a throughput obtained for a particular bit rate stream, or a history of a bit rate stream over the network.

3. The method of claim 1, wherein selecting further comprises, measuring a throughput for each bit rate stream from each media content provider.

4. The method of claim 1, wherein receiving a higher bit rate stream occurs only when a higher bit rate stream is available.

5. The method of claim 1, wherein rendering comprises switching to the higher bit rate stream at a next partition of the stream.

6. The method of claim 1, wherein the second media content provider has a higher bandwidth connection than the first media content provider for higher throughput of the stream to the streaming media player.

7. A non-transient computer readable medium for storing computer instructions that, when executed by at least one processor, cause the at least one processor to perform a method of improving the adaptive bit rate behavior of a streaming media player, comprising:
   receiving a media stream from a first media content provider;
   assessing whether the streaming media player is able to benefit from use of a media stream having a higher bit rate than the stream currently being received and wherein assessing comprises determining whether a buffer will run out of content to render while a network of media content providers is being assessed;
   selecting a higher bit rate stream from a second media content provider when the player can benefit from use of a higher bit rate stream, wherein selecting a higher bit rate stream comprises finding a plurality of higher bit rate streams from a plurality of media content providers;
   requesting the higher bit rate stream from the second media content provider;
   receiving the higher bit rate stream; and
   rendering media content using the higher bit rate stream after waiting for a next partition in the media stream.

8. The computer readable medium of claim 7, wherein assessing further comprises analyzing at least one of a frame rate, a throughput obtained for a particular bit rate stream, or a history of a bit rate stream over the network.

9. The computer readable medium of claim 7, wherein selecting further comprises measuring a throughput for each bit rate stream from each media content provider.

10. The computer readable medium of claim 7, wherein receiving a high bit rate stream occurs only when a higher bit rate stream is available.

11. The computer readable medium of claim 7, wherein rendering comprises switching to the higher bit rate stream at a next partition of the stream.

12. An apparatus for improving the adaptive bit rate behavior of a streaming media player comprising:
   a buffer for receiving a media stream from a first content provider;
   a controller for assessing whether a streaming media player is able to benefit from use of a stream having a higher bit rate than the stream currently being received, determining whether the buffer will run out of content to render while a network of media content providers is being assessed, selecting a higher bit rate stream from a second content provider wherein selecting a higher bit rate stream comprises finding a plurality of higher bit rate streams from a plurality of media content providers, and requesting the higher bit rate stream from the second content provider when the player can benefit from use of a higher bit rate stream; and a renderer operatively coupled with the controller for rendering media content using the higher bit rate stream, such that the renderer waits for a next partition in the media stream and at the next partition, and renders the higher bit rate stream.

13. The apparatus of claim 12, wherein assessing further comprises analyzing at least one of a frame rate, a throughput obtained for a particular bit rate stream, or a history of a bit rate stream over the network.

14. The apparatus of claim 12, wherein selecting further comprises measuring a throughput for each bit rate stream from each media content provider.

15. The apparatus of claim 12, wherein the renderer switches to the higher bit rate stream at a next partition of the stream.

16. The apparatus of claim 12, wherein each bit rate stream corresponds to an individual content provider.

* * * * *